United States Patent Office 3,411,057
Patented Nov. 12, 1968

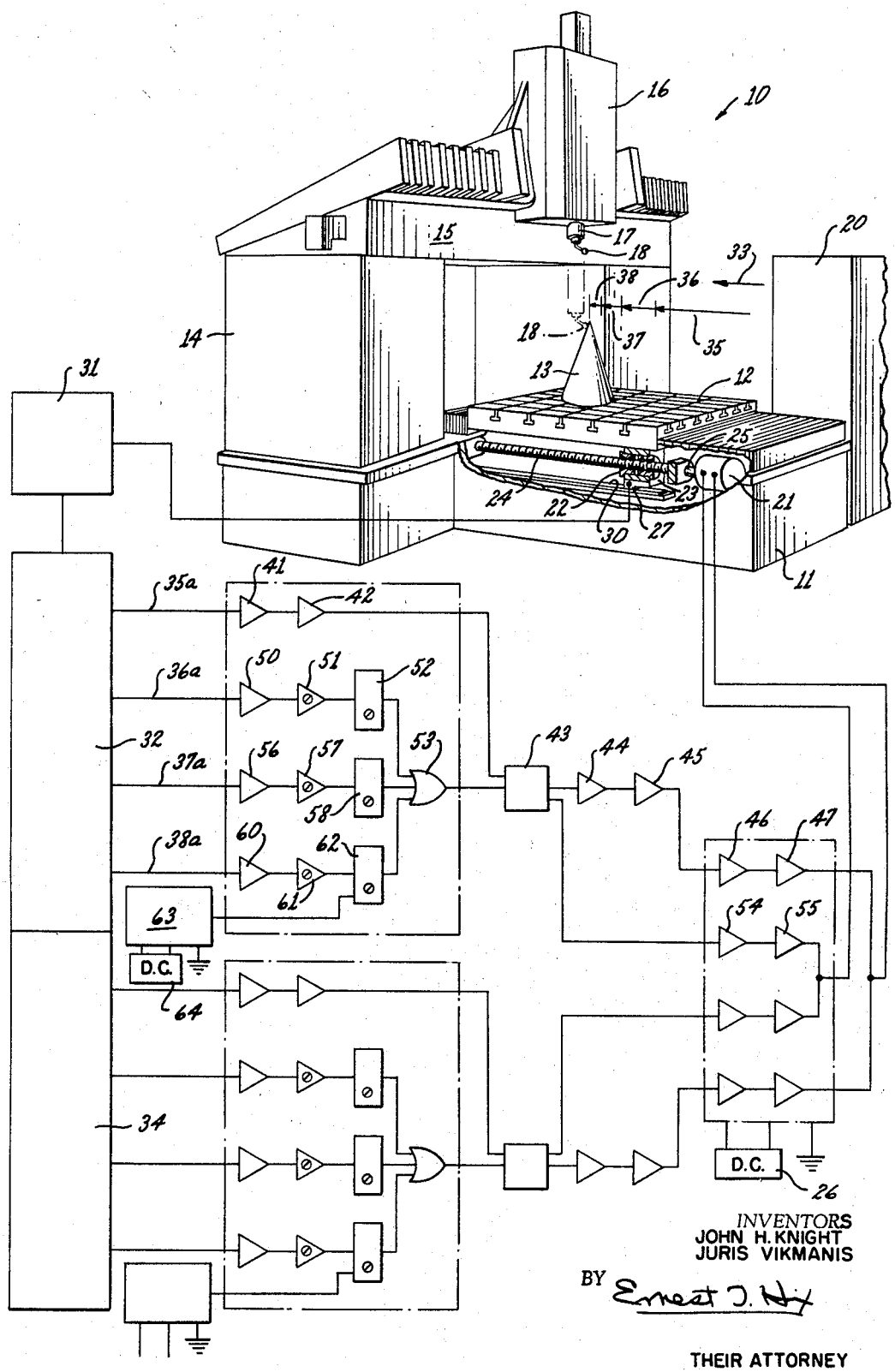

3,411,057
DIGITAL FINE AND COARSE SYSTEM WITH PULSE WIDTH TORQUER
John H. Knight and Juris Vikmanis, Dayton, Ohio, assignors to The Bendix Corporation, a corporation of Delaware
Filed Nov. 18, 1964, Ser. No. 411,981
7 Claims. (Cl. 318—18)

ABSTRACT OF THE DISCLOSURE

An electrical positioning device is disclosed in which the prime mover for a relatively movable carriage obtains its energy from a source of energy having its energy level maintained at a constant magnitude throughout the entire range of displacement of the carriage. The displacement is controlled through the control of the frequency and/or width of the energy pulse as the desired displacement is reached.

---

This invention pertains to electrical devices and more particularly to an electrical positioning device capable of precise control by controlling input power.

Heretofore, many devices have been proposed for precisely positioning and controlling relatively movable machine components such as in machine tools, inspection machines, and the like. However, prior known devices have limitations which preclude their being used to position relatively movable members at high traversing speeds and with great precision of the order of ten millionths of an inch per increment of movement. Such prior devices include those using a stepping motor which controls movements in predetermined steps in accordance with the number of poles used. Other known devices operate on a null balance principle wherein the actuation signal and positioning force is correspondingly decreased in size as a null position is approached, thereby giving troublesome dynamics and making the operation of such systems less efficient.

One object of this invention is the provision of a positioning device which avoids the limitations of previous systems, is simple to construct, has great stiffness, and is reliable and efficient in operation.

Another object of this invention is the provision of a device for positively relatively displacing relatively movable members through a desired displacement at a high speed with great accuracy generally to within a few millionths of an inch.

Another object of this invention is the provision of a device for precise movement wherein the moving force is maintained under accurate control to the precise point of desired relative displacement, thus assuring achievement of the desired displacement.

Another object of this invention is the provision of a device of the character described in which a prime mover is used which obtains its energy from a source having its energy level maintained throughout the range of displacement thus assuring positive movement throughout such range.

Another object of this invention is the provision of a positioning device which can be commanded positively and in finite increments using pulses of energy of known magnitude irrespective of the deviation from the desired displacement and decreasing the effective pulse strength through control of frequency and/or pulse width as the desired displacement is reached thus minimizing tendencies for the system to hunt as a desired displacement is reached.

Other objects and advantages of the invention will be apparent from the following description, the appended claims, and the accompanying drawing, in which, an exemplary embodiment of the electrical device of this invention applied in a measuring machine which is shown in perspective view with parts cut away.

This invention will now be described as applied in an exemplary embodiment to a measuring device or machine 10. Measuring machine 10 includes a base 11 which supports a carriage or slide 12 mounting a workpiece 13 to be measured. Slide 12 moves back and forth on base 11 in a horizontal path. Machine 10 also includes risers 14 which support a gantry 15 supporting a carrier 16 which moves in a horizontal path transverse to the movement of slide 12. Carrier 16 also supports a ram 17 which telescopes vertically and carries a work gaging element 18. While the electrical device of this invention may also be provided on machine 10 for relatively displacing a plurality of members in as many paths such as, for example, carrier 16 horizontally and ram 17 vertically, only the electrical device for slide 12 will be described.

To determine the deviation of workpiece 13 from a nominal or reference dimension, it is positioned on worktable 12 with respect to a known or fixed position. An electrical signal corresponding, for example, to a nominal dimension is provided to machine 10 through a control 20 in any known manner as by tape, punched card, or the like. Such electrical signal is used to precisely position slide 12 a known displacement corresponding to the displacement necessary to position a nominal part to the proper position relative to gaging element 18. The movement of slide 12 is monitored and controlled during motion by the electrical device of this invention. With slide 12 thus positioned gaging member 18 indicates, through circuitry not illustrated, the deviation of the part in the direction of movement of slide 12 from the desired standard and either displays such signal or records it in any suitable manner.

Slide 12 is moved by electric prime mover means operatively connected to the relatively movable members (namely, base 11 and slide 12), including ball screw drive means operatively connected to slide 12 and a direct current operated torque motor or torquer 21 supported on base 11. The ball screw drive means includes a ball nut 22 fixed to a ball nut housing 23 which is in turn fixed to slide 12 and a cooperating screw 24 supported for rotation on base 11. The armature of torquer 21 is fixed to an extension 25 of screw 24 to form a single integral unit to achieve a direct coupling which provides motive energy with minimum hysteresis.

The positioning device is provided with electric motive energy of constant magnitude to maintain high torque irrespective of the deviation from the desired displacement. In this example a source of constant potential is provided by electrical direct current source 26.

Detecting means are provided for determining the displacement of slide 12 with respect to base 11. The detecting means may be of any known form capable of precisely detecting the displacement of slide 12 and providing electrical output signals in response to such displacement. Preferably the detecting means provides discrete pulses or signals for a given increment of movement, although in some applications an analog output may be obtained and converted to digital form.

A typical device for detecting and providing electrical output pulses in response to a finite movement is illustrated in United States Patent 2,886,717 in the form of a noncontact optical system. In such system two superimposed gratings are provided with one grating secured to a reading head 27, which is preferably fixed to housing 23, and a cooperating reflective type grating 30, also described in said patent, is supproted in a fixed position on base 11. The gratings are ruled with equally spaced lines and arranged for relative movement to produce together a cyclic coincidence pattern of alternate opacities and transparencies as reading head 27 and slide 12 move with respect to base 11. Photoelectric cells, not shown, are provided in reading head 27 to detect such pattern and electrical means illustrated at 31 and operatively connected to said detecting means or reading head 27 provide electrical output signals in a manner as described in Patent 2,886,717. Because housing 23 is fixed to slide 12, the detecting means provides discrete electrical output signals or pulses in response to the displacement of slide 12.

Pulse control means operatively connected to electrical means 31 and responsive to the electrical signals therefrom control pulse providing means supplying energy to torquer 21 to vary the duration of said pulses per unit of relative displacement, in this example by selectively controlling the width and the frequency of rate of recurrence of such pulses in a plurality of predetermined zones of relative displacement.

In the illustrated example the pulse control means includes a unit 32 which operates during movement of slide 12 in the direction of arrow 33, while a unit 34 is operative during movement in the opposite direction. Inasmuch as the description of this invention is fully applicable for movement of slide 12 in either direction, for simplicity only movement in the direction of arrow 33, later referred to as the forward movement, will be described in detail. It will be appreciated that source 26 provides electrical energy of constant magnitude which may be achieved through voltage or current control or both.

Each unit 32 and 34 is preferably an electrical device of any known form which operates in effect as a totalizer of discrete electrical pulses, which in this example are received from unit 31 and reflect actual displacement, and compares such actual displacement with a predetermined required displacement.

Unit 32, controlling forward movement, continuously monitors the relative displacement of slide 12 with respect to base 11, and in this exemplary embodiment compares the actual displacement with the desired displacement necessary to position workpiece 13 to a precise predetermined location to enable gaging element 18 to indicate a reading when brought into gaging association therewith. Of course, having thus precisely positioned slide 12 and workpiece 13, any deviation from nominal will be indicated by gaging element 18.

To control the movement of slide 12 so it will gradually and precisely approach the desired displacement, the movement thereof is controlled in a plurality of zones illustrated at 35, 36, 37, and 38. Based upon the number of pulses transmitted to unit 32 it will provide output signals in response to such displacement selectively and in sequence to output channels or lines 35a, 36a, 37a, or 38a corresponding respectively to zones 35, 36, 37, and 38 as the final desired displacement is approached to thereby control the movement of slide 12 as desired.

The output force of torquer 21 is controlled by the precise control of the electrical pulses to such torquer. In this application the resisting force which torquer 21 must overcome is practically constant such that for a given pulse a known displacement of slide 12 may be easily predicted and achieved. Of course the electrical device of this invention is also fully applicable where the resistive load is of a varying nature. In this embodiment continuous energy is provided when the slide and workpiece is a large distance from the desired position. However, as the desired position is approached the pulses are preferably controlled by controlling their width and their frequency or rate and such width and frequency is progressively decreased in a number of predetermined incremental steps or zones corresponding in extent to predetermined displacements of slide 12 with respect to base 11.

As previously mentioned, pulse control is exercised sequentially through zones 35, 36, 37, and 38. In this exemplary application during forward movement as the total desired displacement is approached, full potential is maintained for full torque during each pulse while pulse width is decreased, and the frequency or rate of such pulses is increased for increasingly finer incremental control.

In zone 35 the movement of slide 12 is continuous as a continuous signal is provided from unit 32 through line 35a, to amplifiers 41 and 42 and through an OR gate 43. Such signal is further amplified by amplifiers 44, 45, 46 and 47 and then applied to torquer 21.

As slide 12 moves to position workpiece 13 so it is within zone 36, unit 32 provides an electrical signal through line 36a to those electrical components which will control frequency and width while the slide is moving in zone 36. The electrical signal is amplified by an amplifier 50 and transmitted to means for controlling pulse frequency or rate which in this embodiment includes a unijunction transistor circuit illustrated at 51. Circuit 51 is preferably adjustable to enable accurate control of such pulse frequency. With the frequency of the signal thus controlled it is provided to a device for controlling pulse width or duration which includes an adjustable monostable multivibrator illustrated at 52. The signal is then amplified in an amplifier 53 and provided to OR gate 43. Such signal is further amplified in amplifiers 54 and 55 and then applied to torquer 21. Controlled pulses are thus provided to torquer 21 of a given form while within zone 36.

As slide 12 moves farther to achieve the desired displacement it enters zone 37 at which point unit 32 provides a signal through corresponding line 37a which is amplified in amplifier 56 and provided to another adjustable unijunction transistor circuit 57 similar to circuit 51 and then provided to another adjustable monostable multivibrator 58 similar to unit 52 to control pulse width. Such signal is then amplified in amplifier 53 and then further amplified as previously described before energizing torquer 21.

Slide 12 moves into zone 38 as it moves farther forward causing unit 32 to provide a corresponding signal through a line 38a to an amplifier 60. The signal is then transmitted to another unijunction transistor circuit 61 similar to circuits 51 and 57 previously described for controlling pulse frequency and then the signal is applied to monostable multivibrator as illustrated at 62 and similar to units 52 and 58 previously described. The signal is then amplified in amplifier 53 and after further amplification provided to torquer 21 as previously described. It will be apparent that any number of zones may be provided to achieve pulse control in as many zones of movement or incremental steps as desired.

The illustrated embodiment of this invention also includes an electrical device shown at 63 for providing one pulse of energy at a time to torquer 21. Such circuit makes it possible to manually pulse torquer 21 if desired. Device 63 is shown connected through pulse control circuit 62 and amplifier 50 and is provided with a DC source 64. The width of such pulse is the same as that provided by unit 62. It will be appreciated that a manual pulsing circuit could be provided for energizing torquer 21 with pulses of any desired width.

The electrical components for the reverse mode of operation are similar to those components for the forward mode and are illustrated connected to unit 34. A description for such reverse mode would be similar to the description just completed for the forward mode with allowance for modifying the zones of relative displacement as desired for a reverse movement.

It will be apparent therefore that an electrical device has been presented in which relatively movable members can be relatively displaced through a desired displacement by providing electric motive energy of constant magnitude to torquer 21 irrespective of the deviation from such desired displacement while achieving rapid, positive, and precise displacement as controlled by the position as such relatively movable members in zones along the displacement path and providing controlled pulses of energy as determined by such displacement.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A device for relatively displacing relatively movable members a desired displacement by providing electric motive energy of constant potential irrespective of the deviation from the desired displacement comprising, electric prime mover means for operative connection to the relatively movable members, detecting means for determining the relative displacement of said members, electrical means operatively connected to said detecting means providing output signals in response to said displacement, means providing pulses of electrical energy of constant potential to said prime mover means, and pulse control means operatively connected to said electrical means and responsive thereto for controlling said pulse providing means to control the duration of said pulses in a plurality of predetermined zones of relative displacement, with said constant potential, and progressively decreasing such duration in a number of predetermined incremental steps corresponding in number to the number of zones as the desired displacement is approached to enable controlled positive movement throughout the range of desired displacement.

2. A device for relatively displacing relatively movable members a desired displacement by providing electric motive energy of constant potential irrespective of the deviation from the desired displacement comprising, a direct current operated torquer for operative connection to relatively move said members, detecting means for determining the relative displacement of said members, electrical means operatively connected to said detecting means providing output signals as a function of said displacement, means providing pulses of electrical energy of constant potential to said torquer, and pulse control means operatively connected to said electrical means and responsive thereto for controlling said pulse providing means to selectively control the width and frequency of said pulses in a plurality of predetermined zones of relative displacement, with said constant potential, and progressively selectively decreasing said width and frequency in a number of predetermined incremental steps corresponding in extent to the displacements of the respective zones as the desired displacement is approached to thus enable controlled positive movement throughout the range of desired displacement.

3. A device for positioning a movable member a desired displacement by providing electric motive energy of constant potential irrespective of the deviation from the desired displacement comprising, a base, a movable member supported for movement on said base, antifriction drive means operatively connected to said movable member, a direct current operated torquer operatively connected to said drive means for moving said movable member, detecting means for determining the displacement of said movable member on said base and providing electrical output pulses in response to said displacement, electrical means operatively connected to said detecting means providing a plurality of discrete electrical output signals in response to said displacement, means providing pulses of electrical energy of constant potential to said torquer, and pulse control means operatively connected to said electrical means and responsive thereto for controlling said pulse providing means to selectively control the width and frequency of said pulses in a plurality of predetermined zones of relative displacement, with said constant potential, and progressively decreasing said width and frequency in a number of predetermined incremental steps corresponding in extent to the displacements of the respective zones as the desired displacement is approached to this enable controlled positive movement throughout the range of desired displacement.

4. A device for positioning a movable member a desired displacement by providing electric motive energy of constant magnitude irrespective of the deviation from the desired displacement comprising, a base, a carriage supported for rectilinear movement on said base, ball screw drive means operatively connected to said carriage, a direct current operated torquer operatively connected to said ball screw drive means for moving said carriage on said base, detecting means for determining the displacement of said carriage on said base and providing electrical output pulses in response to said displacement, electrical means operatively connected to said detecting means providing a plurality of discrete electrical output signals in response to said displacement, means providing pulses of electrical energy of constant magnitude to said torquer, and pulse control means operatively connected to said electrical means and responsive thereto for controlling said pulse providing means to selectively control the width and frequency of said pulses in a plurality of predetermined zones of relative displacement, with said energy of constant magnitude, and progressively decreasing said width and frequency in a number of predetermined incremental steps corresponding in extent to the displacements of the respective zones as the desired displacement is approached to thus enable controlled positive movement throughout the range of desired displacement.

5. A positioning device as set forth in claim 4 in which said ball screw drive means comprises, a ball nut fixed to said carriage, and a screw cooperating with said ball nut for positioning said nut and carriage and having a shaft portion which carries the armature of said torquer as an integral part thereof to thus provide motive energy with minimum hysteresis.

6. A device for positioning a movable member a desired displacement by providing electric motive energy of constant potential irrespective of the deviation from the desired displacement comprising, a base, a carriage supported for rectilinear movement on said base, a direct current operated torquer for moving said carriage on said base, a ball nut fixed to said carriage, a screw cooperating with said ball nut for positioning said nut and carriage and having a shaft portion which carries the armature of said torquer as an integral part thereof to thus provide motive energy for said carriage with minimum hysteresis, detecting means for determining the displacement of said carriage on said base and providing electrical output pulses in response to said displacement, electrical means operatively connected to said detecting means providing a plurality of discrete electrical output signals in response to said displacement, means providing pulses of electrical energy of constant potential to said torquer, and pulse control means operatively connected to said electrical means and responsive thereto including a multivibrator and a low frequency oscillator for selectively controlling the width and frequency respectively of said pulses in a plurality of predetermined zones of relative displacement, with said constant potential, and progressively decreasing said width and frequency in a number of predetermined incremental steps corresponding in extent to the displacements of the respective zones as the desired displacement is approached to thus enable controlled positive movement throughout the range of desired displacement.

7. A device for relatively displacing relatively movable members a desired displacement by providing electric motive energy of constant magnitude irrespective of the deviation from the desired displacement comprising, electric prime mover means for operative connection to the relatively movable members, detecting means for determining the relative displacement of said members, electrical means operatively connected to said detecting means providing output signals as a function of said displacement, means providing pulses of electrical energy of constant magnitude to said prime mover means, and pulse control means operatively connected to said electrical means and responsive thereto for controlling said pulse providing means to vary the duration of said pulses per unit of relative displacement, with said energy of constant magnitude, and progressively decreasing as to such duration in predetermined incremental steps as the desired displacement is approached to enable controlled positive movement throughout the range of desired displacement, said pulse control means comprising a low frequency oscillator for controlling pulse frequency and multivibrator for controlling pulse width.

References Cited

UNITED STATES PATENTS

| | | |
|---|---|---|
| 2,714,693 | 8/1955 | Van Eyk. |
| 2,775,727 | 12/1956 | Kernahan et al. |
| 2,864,010 | 12/1958 | Rosenberg et al. |
| 3,260,912 | 7/1966 | Gregory. |

ORIS L. RADER, *Primary Examiner.*

THOMAS E. LYNCH, *Assistant Examiner.*